US007447318B2

(12) United States Patent
Button et al.

(10) Patent No.: US 7,447,318 B2
(45) Date of Patent: Nov. 4, 2008

(54) SYSTEM FOR USING DIGITAL SIGNAL PROCESSING TO COMPENSATE FOR POWER COMPRESSION OF LOUDSPEAKERS

(75) Inventors: Douglas J. Button, Simi Valley, CA (US); Paul Robert Williams, Stevenage (GB)

(73) Assignee: Harman International Industries, Incorporated, Northridge, CA (US)

( * ) Notice: Subject to any disclaimer, the term of this patent is extended or adjusted under 35 U.S.C. 154(b) by 1350 days.

(21) Appl. No.: 09/949,425

(22) Filed: Sep. 7, 2001

(65) Prior Publication Data

US 2002/0118841 A1 Aug. 29, 2002

Related U.S. Application Data

(60) Provisional application No. 60/231,721, filed on Sep. 8, 2000.

(51) Int. Cl.
*H03G 11/00* (2006.01)
*H04R 29/00* (2006.01)
*H04R 3/00* (2006.01)
*H04R 1/00* (2006.01)

(52) U.S. Cl. .............................. 381/55; 381/56; 381/59; 381/397; 381/96; 381/116; 381/58

(58) Field of Classification Search ............. 381/55–59, 381/397, 111, 96, 116
See application file for complete search history.

(56) References Cited

U.S. PATENT DOCUMENTS 4,156,801 A * 5/1979 Whelan et al. .............. 381/398

(Continued)

FOREIGN PATENT DOCUMENTS

EP 52152934 12/1977

(Continued)

OTHER PUBLICATIONS

Hsu, T.S. Temperature prediction of the voice coil of a moving coil loudspeaker by computer simulation. Mar. 2000 Journal of Acoustics Society. All pages.*

(Continued)

*Primary Examiner*—Vivian Chin
*Assistant Examiner*—Devona E. Faulk (57) ABSTRACT

This invention provides a compensation system capable of compensating for power loss due to the power compression effects of the voice coil as the temperature of the voice coil increases. To compensate for the power compression effect, the invention predicts or estimates the temperature of the voice coil using a thermal-model, and adjusts the estimated temperature according to the cooling effect as the voice coil moves back and forth in the air gap. The thermal-model may be an equivalent electrical circuit that models the thermal circuit of a loudspeaker. With the input signal equating to the voltage delivered to the loudspeaker, the thermal-model estimates a temperature of the voice coil. The estimated temperature is then used to modify equalization parameters. To account for the cooling effect of the moving voice coil, the thermal resistance values may be modified dynamically, but since this cooling effect changes with frequency, a cooling equalization filter may be used to spectrally shape the cooling signal, whose RMS level may be used to modify the thermal resistance values. The invention may include a thermal limiter that determines whether the estimated voice coil temperature is below a predetermined maximum temperature to prevent overheating and possible destruction of the voice coil.

36 Claims, 6 Drawing Sheets

U.S. PATENT DOCUMENTS

| | | | | |
|---|---|---|---|---|
| 4,438,411 | A | * | 3/1984 | Rubin et al. ............... 330/289 |
| 5,036,228 | A | * | 7/1991 | Noro ........................ 327/108 |
| 5,418,860 | A | * | 5/1995 | Daniels ..................... 381/400 |
| 5,473,282 | A | * | 12/1995 | Janssens et al. ............ 330/289 |
| 5,577,126 | A | * | 11/1996 | Klippel ....................... 381/59 |
| 5,664,020 | A | * | 9/1997 | Goldfarb et al. ............. 381/89 |
| 5,694,476 | A | * | 12/1997 | Klippel ........................ 381/96 |
| 6,201,873 | B1 | * | 3/2001 | Dal Farra ................... 381/100 |
| 2002/0071568 | A1 | * | 6/2002 | Shuttleworth ............... 381/58 |

FOREIGN PATENT DOCUMENTS

| | | |
|---|---|---|
| WO | PCT/DK97/00012 | 1/1997 |
| WO | WO 9725833 A1 * | 7/1997 |

OTHER PUBLICATIONS

Hsu, T.S., et al. Temperature prediction of the voice coil of a moving coil loudspeaker by computer simulation. Journal of Acoutical Society of Japan, vol. 21, pp. 57-62, Mar. 2000.*

Hsu, T.S, et al. Temperature prediction of the voice coil of a moving coil loudspeaker by computer simulation. Journal of Acoustical Society of Japan, vol. 21, pp. 57-62, Mar. 2000.*

Peter Chapman. Thermal Protection of a loudspeaker. Presented at the 108th Audio Engineering Society (AES) Convention. Feb. 2000.*

Hsu, T.S. et al. Temperature prediction of the voice coil of a moving coil loudspeaker by computer simulation. Journal of Acoustical Society of Japan, vol. 21, pp. 57-62, Mar. 2000.*

Hsu, T.S. et al. Temperature prediction of hte voice coil of a moving coil loudspeaker by computer simulation. Journal of Acoustical Society of Japan, vol. 21, pp. 57-62, Mar. 2000.*

Hsu T. S., et al.: *Journal of the Acoustical Society of Japan*, vol. 21, No. 2, pp. 57-62, Mar. 2000; "Temperature Prediction of the Voice Coil of a Moving Coil Loudspeaker by Computer Simulation".

Gander, M. R., *Journal of the Audio Engineering Society*, vol. 34, No. 9, pp. 627-646, Sep. 1986; "Dynamic Linearity and Power Compression in Moving-Coil Loudspeakers".

"Heat Dissipation and Power Compression in Loudspeakers" *J. Audio Eng. Soc.*, vol. 40, No. 1/2, Jan./Feb. 1992.

"An Electronic Loudspeaker/Enhancement and Protection Device", Paper 6-030, The AES 6th International Conference: Sound Reinforcement; Apr. 1988.

* cited by examiner

SYSTEM FOR USING DIGITAL SIGNAL PROCESSING TO COMPENSATE FOR POWER COMPRESSION OF LOUDSPEAKERS

CROSS-REFERENCES TO RELATED APPLICATIONS

This application is a non-provisional application claiming priority of U.S. Provisional Patent Application Serial No. 60/231,721 filed Sep. 8, 2000.

BACKGROUND OF THE INVENTION

1. Field of the Invention

This invention relates to a system that predicts the temperature of the voice coil in a loudspeaker using a thermal-model, and then using that information to perform appropriate compensation of the audio signal to reduce power compression and provide a desired frequency response across a desired bandwidth.

2. Related Art

An electromagnetic loudspeaker (transducer, motor, or driver) uses magnets to produce magnetic flux in an air gap. These magnets are typically permanent magnets, used in a magnetic circuit of ferromagnetic material to direct most of the flux produced by the permanent magnet through the components of the motor and into the air gap. A voice coil is placed in the air gap with its conductors wound cylindrically in a perpendicular orientation relative to the magnet generating the magnetic flux in the air gap. An audio amplifier is electrically connected to the voice coil to provide electrical signal that corresponds to a particular sound to the voice coil. The interaction between the electrical signal passing through the voice coil and the magnetic field produced by the permanent magnet causes the voice coil to oscillate in accordance with the electrical signal and, in turn, drives the diaphragm and produces sound.

One common problem associated with electromagnetic transducers is the generation and dissipation of heat. As current or electrical signal passes through the voice coil, the resistance of the conductive material of the voice coil generates heat in the voice coil. The tolerance of the transducer to heat is generally determined by the melting points of its various components and the heat capacity of the adhesive used to construct the voice coil. As the DC resistance of the voice coil comprises a major portion of a driver's impedance, most of the input power is converted into heat rather than sound. Thus, the power handling capacity of a driver is limited by its ability to tolerate heat. If more power is delivered to the transducer than it can handle, the transducer can burn up.

Another problem associated with heat generation is temperature-induced increase in resistance, commonly referred to as power compression. As the temperature of the voice coil increases, the DC resistance of copper or aluminum conductors or wires used in the transducer also increases. Put differently, as the voice coil gets hotter, the resistance of the voice coils changes. In other words, the resistance of the voice coil is not constant, rather the resistance of the voice coil goes up as the temperature goes up. This means that the voice coil draws less current or power as temperature goes up. Consequently, the power delivered to the loudspeaker may be less than what it should be depending on the temperature. For example, a voice coil made of copper may have a resistance of 6 ohms at room temperature; but a resistance of 12 ohms at 270° C. (520° F.). Therefore, at higher temperatures, the power output is reduced due to increased coil resistance.

In a typical single coil design using a ceramic magnet, the driver is very large and a heat sink is usually not employed. Accordingly, the temperature in the driver limits the power of the loudspeaker because the driver must not overheat. A common approach in the design of high power professional loudspeakers consists of simply making the driver structure large enough to dissipate the heat generated. Producing a high power speaker in this way results in very large and heavy speaker with a large driver structure to handle the heat generated. Thus, heat production is a major limiting factor in designing loudspeakers. There is a need to overcome the detrimental effect of heat and power compression in designing loudspeakers.

SUMMARY

This invention provides a temperature prediction system for the voice coil using a thermal model. The thermal model is used to perform appropriate compensation of the audio signal to reduce power compression and provide a desired frequency response across a desired bandwidth at different drive levels. That is, the system compensates for adverse effects on the compression and frequency response of an audio signal in a loudspeaker due to voice coil temperature rising. To accomplish this, a signal that is proportional to the voltage being fed to the loudspeaker may be used to predict the temperatures of the voice coil of the loudspeaker, using a thermal model for the loudspeaker. Alternatively, the invention may utilize multiple loudspeakers, and may include band-splitter using time-domain filters with predetermined cutoff frequencies, to determine the specific frequency bands containing relevant parts of the audio spectrum for each of the loudspeakers. In an example embodiment using three loudspeakers, e.g. low, medium, and high frequency loudspeakers, three bands may be used. A thermal model may be associated with each of these loudspeakers so that the temperature of each voice coil may be predicted.

A time-domain digital filter referred to as the cooling filter may model the reduction in voice coil thermal resistance due to a cooling effect. This cooling effect is produced from the movement of the voice coil in a certain frequency range. This cooling filter updates a thermal-modeling system, which in turn computes a temperature parameter. The temperature information may then be used to control respective equalizer/level adjusts (e.g. low, medium, and high frequencies equalizer/level adjusts) to compensate for power compression and uneven frequency response due to high voice coil temperatures. The temperature information can be used with a maximum coil temperature detector that controls a preamp to reduce the overall audio signal if the temperature of the coils is beyond an acceptable level.

Alternatively, the invention may utilize a fast fourier transform (FFT) algorithm to measure the frequency spectrum and level of an input audio signal. This information may then be used for the purpose of modeling the cooling effect. One of the advantages with the invention is that the temperature of the voice coil is predicted based on the frequency and amplitude of the audio signal, rather than actually measuring the temperature of the voice coil using a sensing element. Moreover, with the invention, there is no longer a need for a feedback controller that operates in conjunction with the sensing element to control the temperature effects, such as frequency response equalization, and power compression. As a result, the invention reduces the cost of manufacturing the integrated system without a sophisticated controller, sensing element, and the speaker subassembly.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
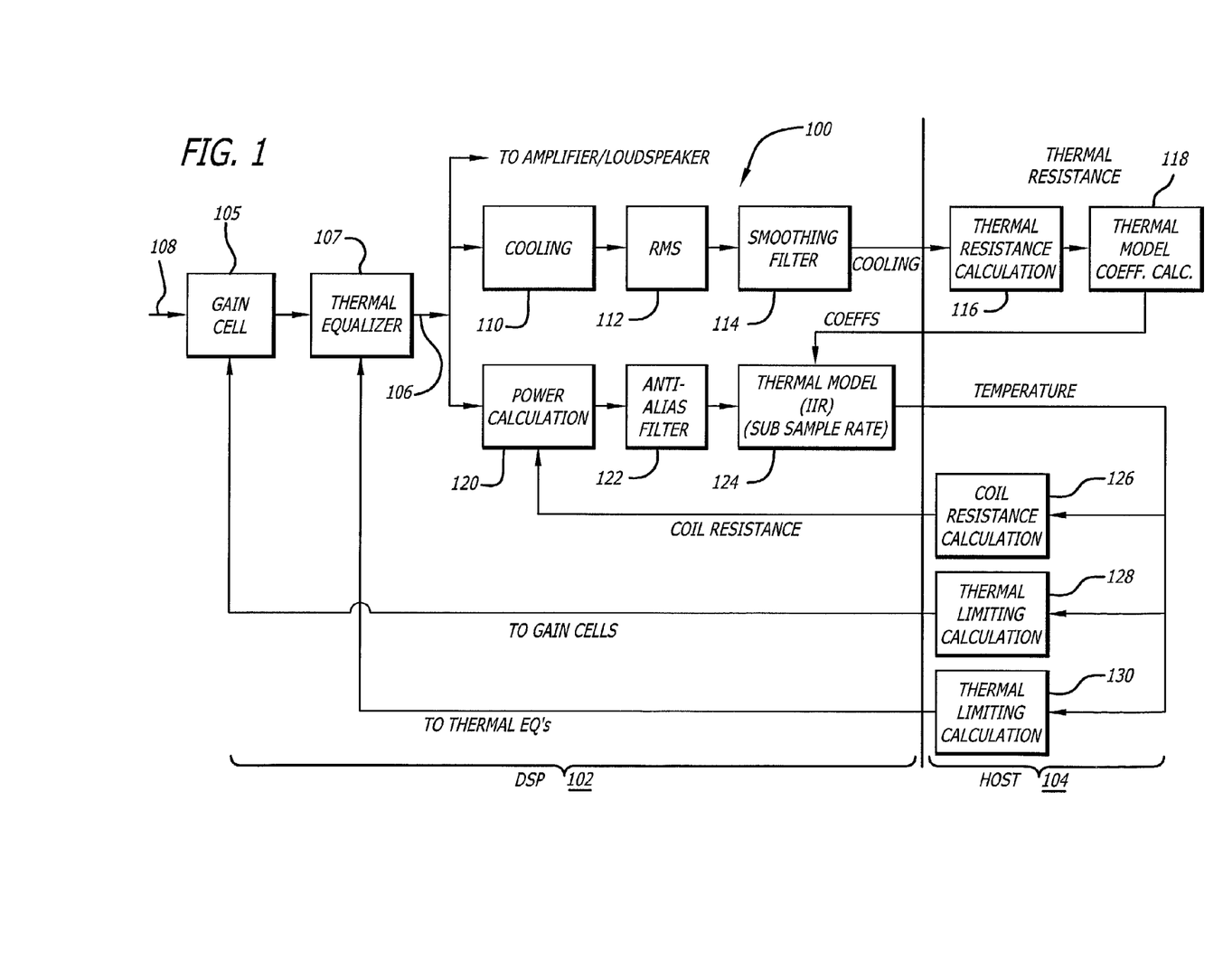
FIG. 1 illustrates a thermal processing block diagram that compensates for loss of power due to the power compression effects on a voice coil as the temperature of the voice coil gets higher.

FIG. 1 illustrates a Thermal Processing Engine block diagram (TPE) 100 that compensates for loss of power due to the power compression effects of the loudspeaker as the temperature of the voice coil and the loudspeaker rises. To compensate for the power compression effect, the invention may predict or estimate the temperature of the voice coil using a thermal-model, and adjusting the estimated temperature accordingly due to the cooling effect as the voice coil moves back and forth in the air gap. The TPE 100 may be shared between a signal processor 102, such as a digital signal processor (DSP), and a host processor 104. The processing that does not need to be done at the audio sample rate may be run in the host processor 104 such as a general purpose microcontroller, where a better floating point math and a better development environment may be available.

On the input side 108, the signal passes through a Gain Cell 105 and then a Thermal Equalizer 107, both of which would normally pass the signal substantially unaltered, to produce a signal that may be ultimately scaled and sent to the loudspeaker. The scaled signal 106 may be equivalent to a voltage that is being applied to a loudspeaker. If the loudspeaker operates at low to mid range frequency between about 20 Hz to about 200 Hz, then the TPE 100 may account for the cooling effect on the voice coil to adjust the temperature of the voice coil. On the other hand, if the loudspeaker operates in a mid to high frequency (HF) range above about 200 Hz, then the TPE 100 may not be needed to account for any additional cooling effect on the voice coil. That is, the excursion or range of movement of the voice coil in a HF loudspeaker is less when compared to the low-frequency (LF) and mid-range loudspeakers. With less excursion range in the air gap, the voice coil does not cool as much so that the cooling effect in a HF loudspeaker may be negligible. Accordingly, TPE 100 may only account for the cooling effect on the voice coil for mid-range to LF loudspeakers when estimating the temperature of the voice coil.

For LF and mid-range frequency loudspeaker, the DSP 102 performs the cooling EQ step 110, to provide the cooling effect depending on the operating frequency of the loudspeaker. Since the output from the Cooling EQ step may be an AC signal, a root-mean-square (RMS) step 112 may be done to convert the AC signal to a DC signal. The DC signal generally represents the cooling effect on the voice coil from the output of the cooling EQ step 110. To send the DC signal to the host processor 104, an anti-aliasing or smoothing filtering step 114 may be needed because the sampling rate of the host processor 104 may be less than the output from the RMS step 112 of the DSP 102.

Figure 2:
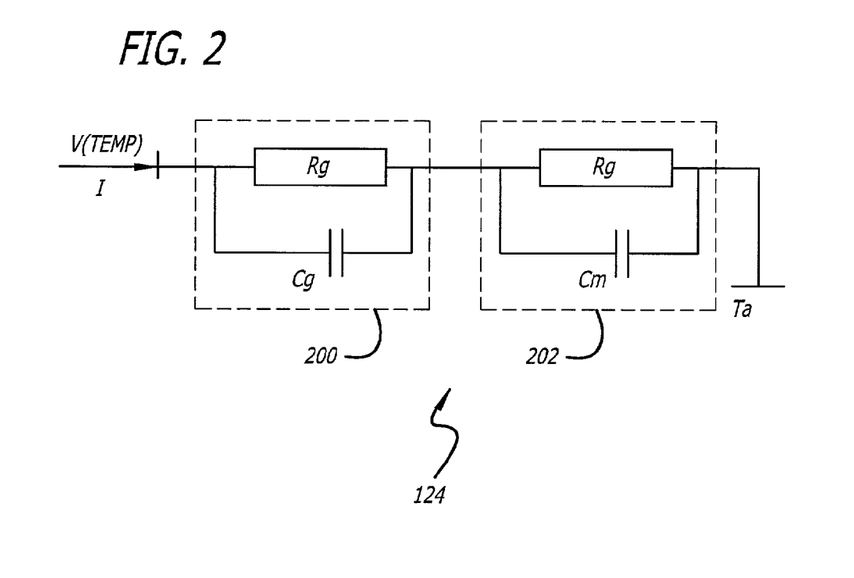
FIG. 2 is an analog thermal circuit model for a voice coil.

From the smoothing filtering step 114, the host processor 104 takes the cooling effect and performs the thermal resistance calculation step 116 to calculate the thermal resistance used in a thermal-model, as discussed in more detail below. In short, a pair of RC circuits as illustrated in FIG. 2 are used as a thermal-model of the voice coil. In other words, the cooling effect is used to adjust the thermal-model 124 in the DSP 102 that estimates the temperature of the voice coil. Since the thermal-model 124 resides in the DSP, a thermal-model coefficient calculation step 118 may be performed in order to pass the thermal resistance information back to the thermal-model step 124 in the DSP 102. Again, the steps discussed above may be needed for LF and mid-rang frequency loudspeakers because the thermal resistance is continuously affected by the cooling effect due to high excursion range of the voice coil. For HF loudspeakers, however, the thermal resistance may be calculated once to set up the thermal-model in step 124.

For all loudspeakers, the DSP 102 takes the scaled signal 106, which may be equivalent to a voltage that is being applied to a loudspeaker and initial thermal resistance of the voice coil at room temperature, and calculates the power being provided to the loudspeaker in step 120. Since the sample rate in the power calculation step 120 may be greater than the thermal-model 124, an anti-aliasing filtering step 122 may be provided between the steps 120 and 124. In other words, the anti-aliasing filtering step 122 prevents the output signal from changing at a rate that is too fast for the sample rate of the thermal-model 124 to track. The thermal-model 124 then generates an estimated temperature of the voice coil based on the power that is being provided to the loudspeaker.

The estimated temperature from the thermal-model 124 may be then provided to the host processor 104 to conduct the following three steps. In step 126, coil resistance calculation is done at an elevated temperature where the coil resistance is linearly related to the temperature of the voice coil. The coil resistance at a higher temperature is fed back to step 120 to update the power calculation. In other words, the initial resistance of the voice coil at room temperature is updated with the revised coil resistance from step 126 due to elevated temperature of the voice coil.

In step 128, the thermal limiter checks whether the estimated temperature of the voice coil is below a predetermined maximum temperature or not to prevent the voice coil from burning up. If the estimated temperature is less than the maximum predetermined temperature then TPE 100 continues to provide power to the loudspeaker. But if the estimated temperature is above the maximum predetermined temperature than the TPE 100 gradually reduces the gain of gain cell 105 to reduce the power being delivered to the loudspeaker, i.e., turn the volume down to prevent the voice coil from burning up.

In step 130, to compensate for the power compression effect, the calculated temperature of the loudspeaker voice coil is used to calculate the parameters required in the equalizing filter 107 to negate the effect of power compression and frequency response changes. The information about the coil temperature values is sent to thermal equalizers 107, which are running in the DSP 102. The equalizers then adjust the gain in the signal power so that the frequency response of the loudspeaker is substantially constant regardless of the power being delivered to the loudspeaker. FIG. 1 as discussed above generally illustrates a one-band TPE 100 for estimating the temperature of the voice coil. Alternatively, the TPE 100 may be adapted for a multiple band system by providing a band splitter.

FIG. 2 illustrates an equivalent electrical circuit that represents the thermal-model 124 for a loudspeaker. With regard to the thermal model 124, an article written by Douglas J. Button, entitled "Heat Dissipation and Power Compression in Loudspeakers" published in J. Audio Eng. Soc., Vol. 40, 1992 January/February, and is incorporated by reference into this application, discusses some portion of the thermal-model 124 utilized in this application. As discussed in part in Doug Button's article:

Loudspeakers are inefficient devices. Electrical-to-acoustical conversion efficiencies are typically less than 5%. Consequently 95% or more of the power delivered to a loudspeaker is turned into heat, and this heat must be dissipated. The source of the heat is the voice coil, and the heat generated is, $$Q=i^2 Z \quad (3)$$

where

Q=heat power, W
i=current in voice coil, A
Z=minimum impedance, $\Omega$.

A special note on impedance: The heat dissipated is greater than $i^2$ Re, where Re is the dc resistance. Additional resistance that will generate heat is due to eddy currents in the magnet structure. When considering the heat generated, this is a part of the minimum impedance. The minimum impedance is almost always larger than the expected value obtained by incorporating the acoustical radiation resistance. More specifically, the minimum impedance will be more than 5% greater than the dc resistance for a driver that is 5% efficient. Consequently the minimum impedance is a better value to use when calculating Q.

In other words, because the heat generated is in the center of the loudspeaker, the motor structure and frame may be utilized as thermal paths to dissipate the heat from the voice coil. The thermal performance of the coil may be represented as the thermal-model 124 in a classical analog circuit including resistors and capacitors, as shown in FIG. 2. The thermal-model 124 disclosed in FIG. 2 can be viewed as including: (a) Current I, which may be equivalent to the power in the thermal circuit; (b) Voltage V, which may be equivalent to the temperature above the reference temperature (ambient) Ta in the thermal circuit; (c) Rg may be equivalent to the thermal resistance from coil to magnet structure; (d) Rm may be equivalent to the thermal resistance from magnet structure to ambient air; (e) Cm may be equivalent to the thermal capacitance of magnet structure; and, (f) Cg may be equivalent to a zone thermal capacitance of voice coil and nearby surroundings.

Figure 3:
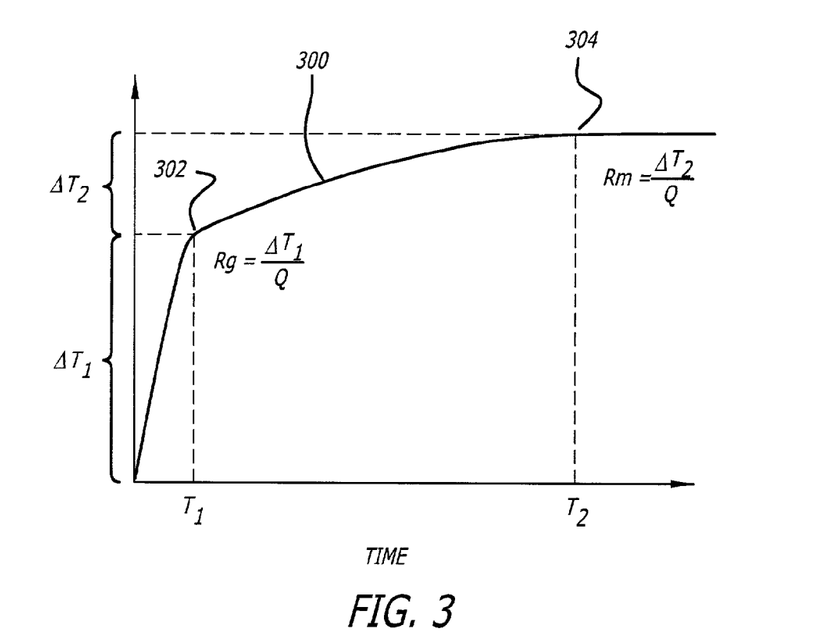
FIG. 3 is a graph showing a plot of a voice coil temperature versus time.

From the thermal-model 124 described in FIG. 2, the thermal effects in the voice coil may be represented as a curve 300, in FIG. 3, which is voice coil temperature versus time. The first period from t=0 to t=$t_1$ and the temperature rise from ambient to $\Delta T_1$ are the response of the first RC pair 200 (see FIG. 2); the time from $t_1$ to $t_2$ and the temperature change from $\Delta T_1$ to $\Delta T_2$ are from the second RC pair 202. Almost all loudspeakers will generate a curve similar to that in FIG. 3 when a constant voltage source is applied, and each loudspeaker can be characterized by a $t_1$, $t_2$ and $\Delta T_1$, $\Delta T_2$ for a given power. The first RC knee 302 generally defines the thermal resistance of the voice coil to its nearby surroundings, the thermal capacitance of the coil, and a small zone around it. The second RC knee 304 generally defines the thermal resistance of the pot structure, frame to air, and the thermal capacitance of the structure.

The elements R and C may be measured and expressed in simple terms. From FIG. 2, the first RC circuit 200 defines the short-term thermal behavior (the voice-coil area), which is considerably worse than the second RC circuit 202. The thermal capacitance may be low and heat-up may be very rapid. The thermal resistance, derived from $\Delta T_1$ may be much larger than that derived from $\Delta T_2$. In other words, the voice coil is the weak link in dissipating heat.

Understanding the heat dissipation character of speakers, that information may be related to useful performance calculations. As the voice coil heats up, it may never operate at room temperature. The dc resistance of the voice coil expressed as a function of voice coil temperature may rise with temperature according to:

$$R(T)=R_{cold}(1+0.00393\Delta T), \quad (4)$$

where $\Delta T$ is the coil temperature rise above ambient in degrees Celsius. Moreover, the power into a minimum impedance of voice coil (cold) may be expressed as, $$P = \frac{V^2}{Z} \quad (5)$$

where, Z is the minimum impedance, and V is the voltage applied to the coil. It is well established in the art that the power compression in dB, which is a reduction in output sound pressure level (SPL) over the true maximum achievable SPL for the voice coil, is given by, $$\text{PowerCompression} = 10 \frac{\log[PR_o(1 + 0.00393\Delta T)]}{T} \quad (6)$$

where Ro is the resulting thermal resistances in series, i.e., Ro=Rg+Rm (see FIG. 2), and $$\Delta T = \frac{-(k_1/k_2) \pm \sqrt{(k_1/k_2)^2 + (4R_o V^2/k_2 R(T))}}{2} \quad (7)$$

with, k1=Z/R(T), k2=0.00393. From equation (7), temperature rise ($\Delta T$) of a loudspeaker may be calculated knowing the voltage level, dc resistance, and minimum impedance. From equation (7), i.e., calculating the temperature rise ($\Delta T$), then the power compression may be calculated from equation (6).

Besides power compression, the TPE 100 may also account for the cooling effect as discussed above in block diagrams 110 to 118 in FIG. 1. At certain frequencies (particularly low frequencies), the movement of the voice coil generates a lot of cooling. In other words, air may rush around to dissipate the heat generated in the voice coil. To account for this, the TPE 100 in the thermal resistance calculation step 116 adjusts for the cooling effect based on equation (4). That is, the voice coil resistance starts to drop with a lowered voice coil temperature. Accordingly, the thermal-model 124 may be dynamically modified to more accurately model the cooling effect of the voice coil while it vibrates in the air.

One of the consequences of not minimizing the power compression is that it will lead to distortion in the speaker frequency response. Hence, one of the features of the invention is to obtain a temperature estimate from a voice coil thermal model to design a filtering scheme aimed at reducing the power compression as set forth in equation (6), while retaining the frequency response as closely as possible to the speaker response when the coil is at a room temperature. Because the invention is a thermal-model, this obviates the need for a sensing element, thereby reducing the cost of manufacturing the system.

Figure 10:
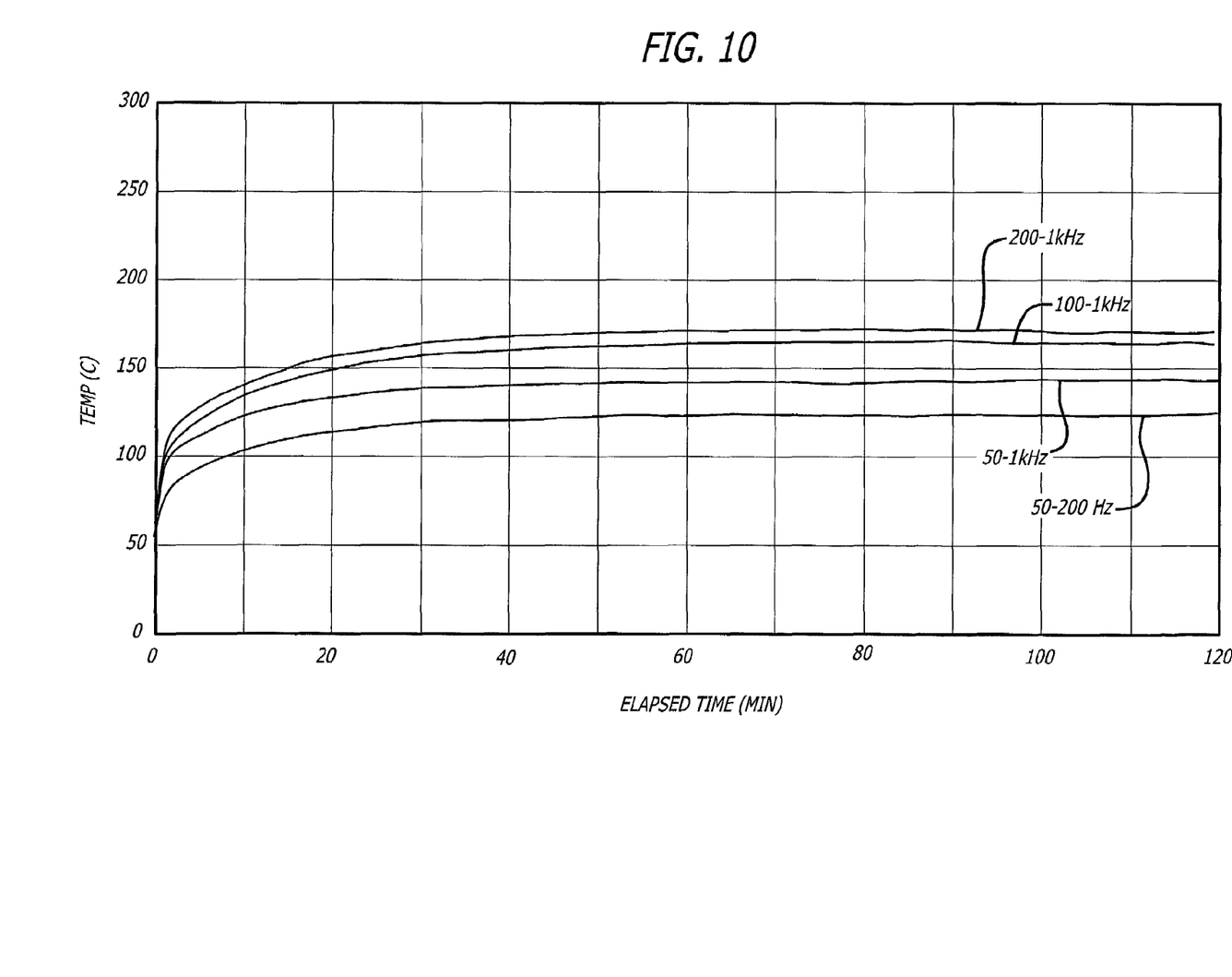
FIG. 10 is a graph showing curves for mapping the spectral content of the input signal and elapsed time of loudspeaker operation versus temperature of voice coil.

For example, the thermal-model RC network 124 in FIG. 2 may be modeled by a (M,N) filter, whose numerator polynomial is of order-M, whereas the denominator polynomial is of order N. This may be written as, $$H_{thermal}(z) = \frac{\sum_{k=0}^{M} b_k z^{-k}}{\sum_{k=0}^{N} a_k z^{-k}} \quad (8)$$

where, $b_k$ and $a_k$ are the thermal-model filter coefficients that need to be determined, and z=exp(jω); j=$\sqrt{-1}$; ω=2πk/N. Alternative methods such as the adaptive scheme like the Steiglitz-McBride algorithm or nonadaptive scheme based on eigenfilter computation may be used as well for computing the filter coefficients. Also, the Bilinear Z Transform (BZT) can be used to convert from the analog (S-plane) model to the Z-plane equivalent. The filter structure may have the order (M,N)=(0,2) (with b0=1) resulting in a second order infinite duration impulse response (IIR) thermal filter that may be considered sufficient. That is, the output of the filter is a temperature estimate via a frequency-temperature map as depicted in the plot of FIG. 10. For example, if the loudspeaker has been operating for 20 minutes, and the frequency content of the input signal is band limited to lie between 50-200 Hz, then the estimated temperature via the map may be about 112 degrees Celsius. Alternatively, this map may be based on an expert generated fuzzy logic/neural network mapper that is an artificial intelligence based scheme.

Once the thermal-model 124 generates the temperature, the host processor 104 may provide the following three calculations. First, the coil resistance calculation step 126 may be done using equation (4) as the temperature changes and fed back to power calculation step 120 (see FIG. 1). Second, a thermal limiting calculation step 128 may be provided to output a gain compensator to eliminate over drive or over heating. This gain compensator may be in the form of a gain cell 105. The gain cell may be applied ahead of the amplifier. That is, the gain system uses the estimated temperature information whereby the gain is gradually reduced towards zero if the temperature is over a predetermined limit, and gradually restored to unity if the temperature is under the predetermined limit.

Figure 4:
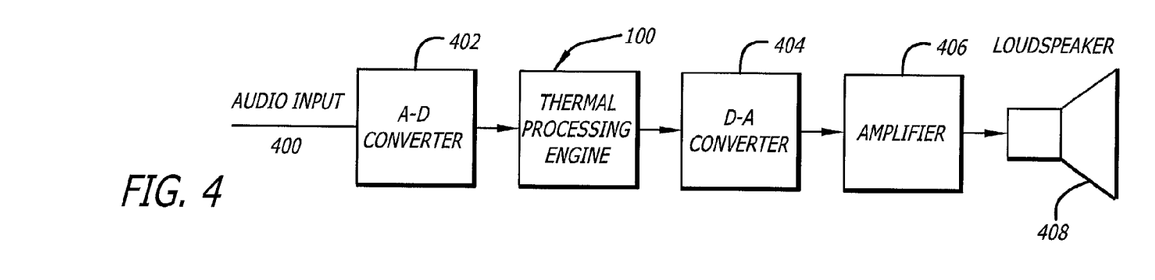
FIG. 4 illustrates a block diagram for a single band power loudspeaker system.

FIG. 4 illustrates a powered loudspeaker system incorporating the TPE 100 for a single-band system. The audio input signal 400 may be supplied from a variety of sources such as a mixer, CD player, video, and microphone. For an analog input, the A-D converter 402 may convert the analog signal to a digital signal. If a digital signal is provided, then the A-D converter 402 may not be necessary. The digital signal is then fed to the TPE 100 to process the digital signal to compensate for loss of power due to the power compression effects on the loudspeaker as the temperature of the voice coil and the loudspeaker rises. The D-A converter 404 then converts the digital signal from the TPE 100 to an analog signal, which is then amplified by the amplifier 406 before being fed to the loudspeaker 408.

Figure 5:
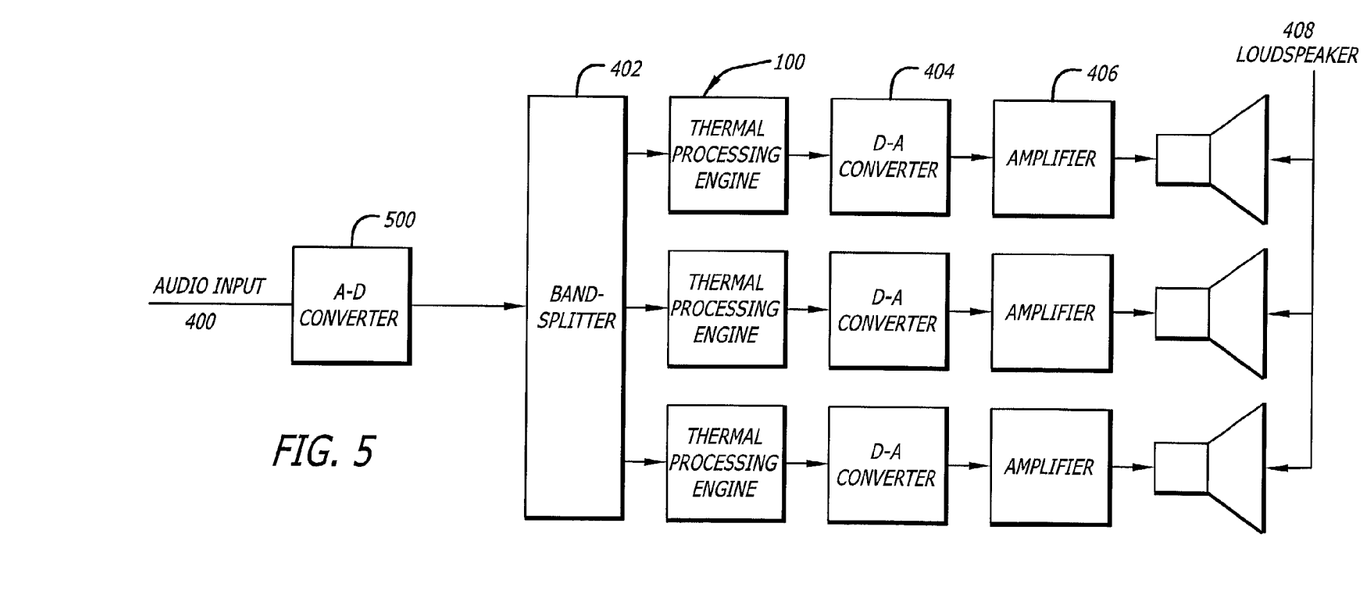
FIG. 5 illustrates a block diagram for a three bands power loudspeaker system.

Alternatively, FIG. 5 illustrates a three-band system. A band splitter 500 may decompose the spectral information in the input signal 400 into three multiple bands. Of course, the band splitter may decompose the spectral information into any number of bands, where the lower limit may be bounded by unity and the upper limit may be bounded by an arbitrary integer. For example, three exemplary bands may be approximately 20 Hz and 200 Hz for a low band, approximately 200 Hz and 1000 Hz for a mid band, and approximately 1000 Hz and 20 kHz for a high band. Of course, other frequency ranges may define the low, mid, and high band frequencies. The three band signals are then processed by the TPE 100, D-A converter 404, and the amplifier 406 as discussed in FIG. 4.

Moreover, the operation of the gain cell may be limited by the presence of a preset threshold temperature that the voice coil is subjected to. Thus, for example, if the temperature of the voice coil exceeds the threshold, the gain may be slowly removed. This protects the voice coil from burning out. As an example the invention may consider the following mechanism for gain control for a thress band system, $T = \max\{T_{low}, T_{medium}, T_{high}\}$ $T = \max\{T_{low}, T_{medium}, T_{high}\}$ $\alpha_T(k+1) = \begin{cases} \beta \alpha_T(k) + (1-\beta); T < \text{threshold} \\ \beta \alpha_T(k); T > \text{Threshold} \end{cases}$ $0 < \beta < 1$

0<β<1

Figure 6:
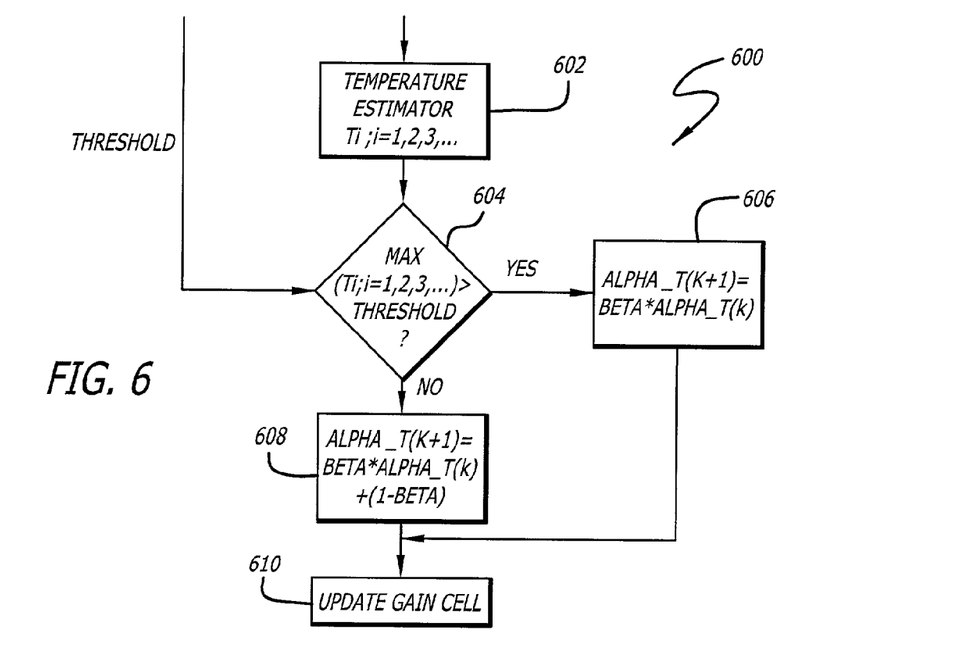
FIG. 6 is a flowchart representing a gain control to limit the temperature of the voice coil.

For example, FIG. 6 illustrates a flow chart 600 representing a gain control for a three-band system. The temperature estimator 602 processes the three bands and provides a temperature estimate for the three bands. A decision block 604 may be provided to determine if any of the estimated voice coil temperatures are above a predetermined threshold. If any of the temperatures is above the threshold, then the gain of all bands may be adjusted in block 606. The gain cells alpha (k) at time index 'k' is reduced by a factor 'beta' to provide thermal limiting. In essence, this gain is reduced exponentially gradually towards 0 until the temperature falls below the threshold. When the temperatures are all below threshold the gain is gradually exponentially restored to the 'normal' gain as depicted in block 608, and the gain cells may be appropriately updated as in block 610.

Figure 7:
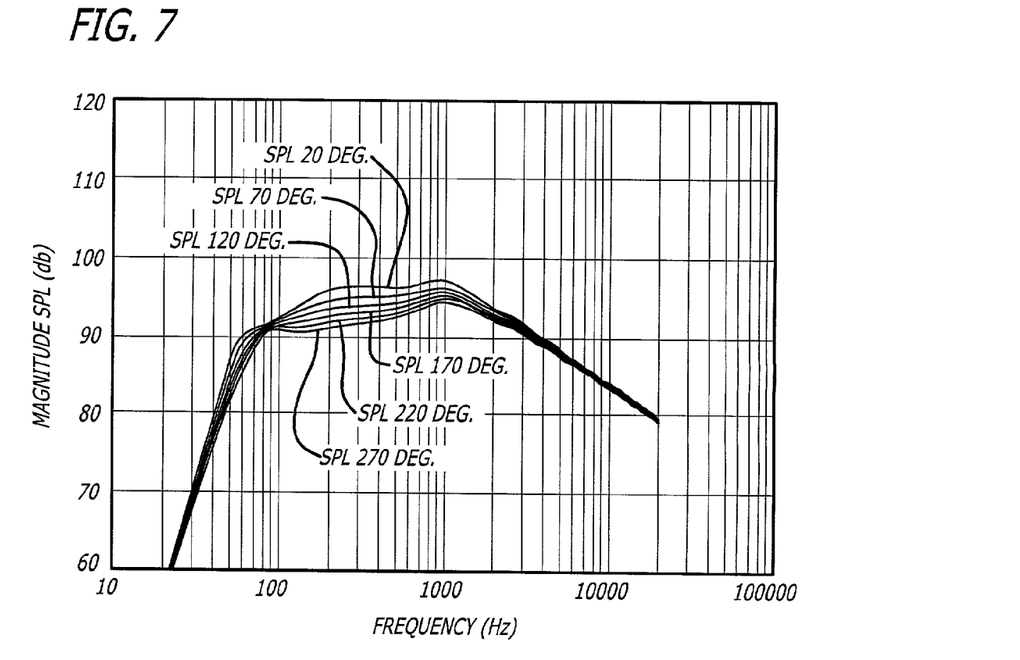
FIG. 7 is a graph showing the frequency response curves as a function of voice coil temperature.
Figure 8:
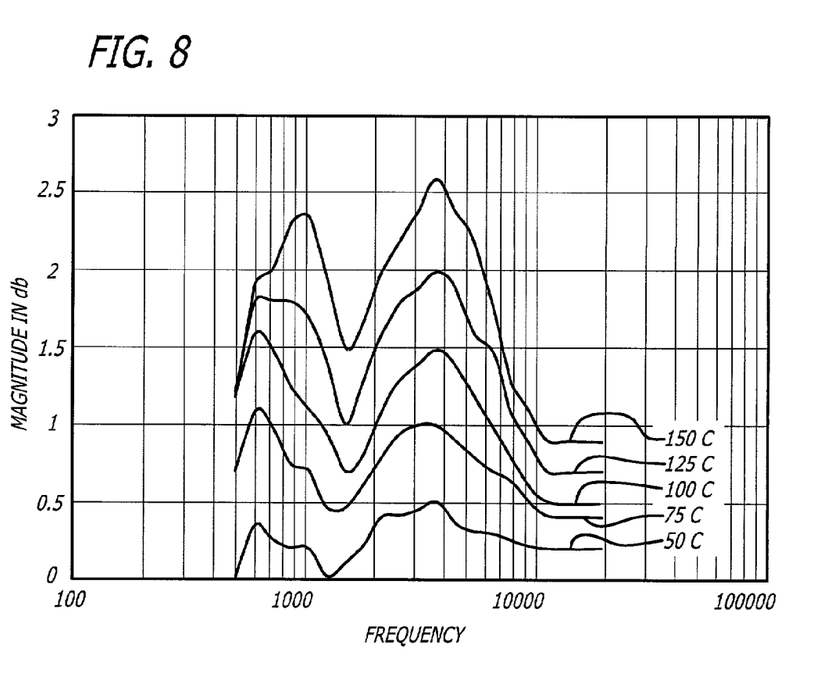
FIG. 8 is the equalizer responses that are determined on applying an equalizing filter to the loudspeaker frequency response.

Third, in the thermal equalization step 130, once the temperature estimate is generated for the different bands, the host processor 104 may have a temperature-speaker frequency response relational system, such as the one depicted in FIG. 7. A lookup-table scheme may be used that has the actual frequency responses stored for different voice coil temperatures. Also, FIG. 7 illustrates a marked change in the frequency response curves from the ambient, due to changes in the voice coil temperatures. FIG. 8 illustrates different required equalizer gain curves as a function of frequency and voice coil temperatures. Note that the temperature-speaker frequency response as depicted in FIGS. 7 and 8 may be different for each loudspeaker.

Figure 9:
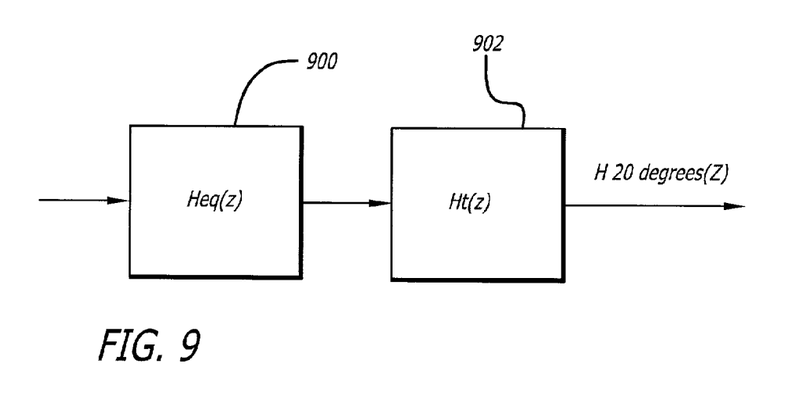
FIG. 9 is a block diagram representing an equalizing filter coupled to a loudspeaker frequency response for a given temperature of a voice coil.

As illustrated in FIG. 9, an equalization filter may be needed to modify the frequency response curve to that of the ambient. This means that an equalization filter that satisfies the following may be used, $$H_{eq}(z) H_T^{spkr}(z) \approx H_{20deg}^{spkr}(z) \quad (9)$$

where the subscript T denotes the voice coil temperature of the loudspeaker, and Heq(z) is the equalizing filter 900, and $H_T^{spkr}(z)$ 902 corresponds to the loudspeaker frequency response curves of FIG. 7 for different temperatures T. Alternatively, rather than a lookup-table scheme, equalization boost values may be calculated by employing an equation such as B'=B*T/Tref, where B' is the effective boost applied to the frequency response at an elevated temperature, B is a boost applied to the frequency response at the reference temperature, T is the voice coil temperature above reference, and Tref is the reference elevated temperature. Other methods known to one skilled in the art may be used as well, such as a rule-base based relational system incorporating rules such as, "if the temperature is low, then the approximate frequency response of the speaker may be $$\hat{H}_{low}^{spkr}(z).\text{"}$$

Accordingly, the TPE 100 may process the input signal 108 as the following: The temperature value (suitably scaled) may be read periodically, approximately every 100 ms, for example. This may change very slowly, so a check may be done to see if it has changed since the last time. If it has changed, the following computations may be carried out: (a) In step 126, recalculate the voice coil resistance based on equation (4), which may be based on most recent estimated temperature from the thermal-model 124. The recalculated voice coil resistance is then sent to the power calculation step 120 in the DSP 102. (b) In step 128, recalculate thermal limiting 60 and send the gain coefficients to the gain cells 105 for all 3 bands. The gain of all three bands may be reduced if the temperature in any voice coil exceeds a predetermined maximum. This may use the same gain primitives as dual-purpose band gain and thermal limit gain cells. And (c) in step 130, recalculate the thermal equalization parameters and send the coefficients to a thermal equalizer 107.

In step 116, the smoothed (anti-aliased) cooling effect value may be read quite frequently, for example every 100 ms. Every read for the cooling effect value may result in a recalculation and delivery of the thermal-model IIR coefficients by the coefficient calculator 118 to the thermal model 124. The following parameters may be available for reading within the host processor 104, (a) Instantaneous Temperature×3 bands which may be read from the DSP and then scaled; (b) Instantaneous Cooling effect×3 bands which may be read from the DSP, then scaled; (c) Thermal limiting×3 bands which may be calculated from the temperature parameter; (d) Coil resistance (Ohms)×3 bands which may be calculated from the temperature parameter. Moreover, the above parameters may be scaled suitably for the DSP.

The TPE 100 may be based on an equivalent electrical circuit that models the thermal circuit of a loudspeaker. With the input signal equating to the power delivered to the loudspeaker, the thermal-model estimates a temperature of the voice coil. The estimated temperature is then used to modify equalization parameters. To account for the cooling effect of the moving voice coil, the thermal resistance values may be modified dynamically, but since this cooling effect changes with frequency, a cooling equalization filter may be used to spectrally shape the cooling signal, whose RMS level may be used to modify the thermal resistance values.

Alternatively, the invention may be used for an electric motor application as well. For example, the TPE 100 may be used to compensate for loss of power due to the power compression effects in the electric motor as the temperature of the motor winding rises. To compensate for the power compression effect, the temperature of the motor winding using a thermal-model may be estimated, and adjusting the estimated temperature accordingly due to the cooling effect depending on the rotation or RMP of the winding. Here, the cooling effect on the motor winding increases as the motor winding rotates faster. To prevent the motor winding from over heating, the estimated temperature of the motor winding may be checked to determined if it is below a predetermined maximum temperature. If the estimated temperature is less than the maximum predetermined temperature then TPE 100 continues to provide power to the electric motor. But if the estimated temperature is above the maximum predetermined temperature than the TPE 100 gradually reduces the gain in the power that is being delivered to the electric motor. Besides electric motors, the present invention may be used to account for the power compression in such devices as transformers.

While various embodiments of the application have been described, it will be apparent to those of ordinary skill in the art that many more embodiments and implementations are possible within the scope of this invention. Accordingly, the invention is not to be restricted except in light of the attached claims and their equivalents.

What is claimed is:

1. A method for compensating for temperature dependent performance degradation in a loudspeaker, comprising:

predicting an input power being delivered to a voice coil based on an input signal representative of voltage being fed to a plurality of loudspeaker where the voice coil is one of a plurality of voice coils that are each associated with a loudspeaker in the plurality of loudspeakers;

processing the input signal to each loudspeaker through a separate thermal-processing engine coupled to each voice coil, estimating a temperature for each voice coil based on a thermal-model included in each thermal-processing engine, wherein the thermal-model is changed dynamically by application of a coefficient to the thermal-model in response to a cooling effect value sampled at predetermined times to estimate the cooling effects of the voice coil movement;

calculating a coil resistance, and a gain compensation based on the temperature; and modifying the input signal to the plurality of voice coils with equalization parameters that are set in response to the thermal-model, whereby the gain is reduced to zero if the temperature reaches a predetermined limit and restored to unity if the temperature is under the predetermined limit.

2. The method according to claim 1, wherein the thermal-model includes:

a voice coil thermal impedance having a first thermal resistance from a voice coil to a magnet structure and a first thermal capacitance of the voice coil to an immediate environment where the first thermal resistance and the first thermal capacitance are coupled in parallel; and a magnetic structure thermal impedance having a second thermal resistance of magnetic structure to ambient air, a second thermal capacitance of magnet structure to ambient air, and where the second thermal resistance and the second thermal capacitance are coupled in parallel; and where the voice coil thermal impedance and the magnetic structure thermal impedance are coupled in series.

3. The method according to claim 2, wherein the estimating the temperature of the voice coil based on the thermal-model further includes:

determining a frequency dependent voice coil thermal impedance characteristic; and calculating the power into a voice coil based on the voice coil thermal impedance.

4. The method according to claim 1, wherein said temperature estimate is obtained from a computing device.

5. The method according to claim 4, wherein the computing device computes with a filter.

6. The method according to claim 5, wherein the filter is an infinite duration impulse response (IIR) filter.

7. The method according to claim 5, further including equalizing the filter to correspond to a frequency response curve for a loudspeaker that is modeled by a function.

8. The method according to claim 7, wherein the function is a lockup table.

9. The method according to claim 7, wherein the frequency response corresponds to a loudspeaker ambient frequency response.

10. A method for preventing a voice coil from overheating, comprising:

predicting power being delivered to a voice coil selected from a plurality of voice coils based on an input signal representative of voltage being fed to a plurality of loudspeaker, where each loudspeaker is associated with one of the plurality of voice coils;

processing the input signal to each loudspeaker through a separate thermal-processing engine coupled to each voice coil;

estimating a temperature for each voice coil based on a thermal-model included in each thermal processing engine with predicted power to the voice coil as an input signal, where the thermal-model is dynamically modified by application of a coefficient to the thermal-model in response to a cooling effect value sampled at predetermined times to account for the cooling effect of movement of the voice coil at a low frequency range;

calculating a coil resistance, and a gain compensation based on the temperature; and providing a gain reduction when the temperature reaches a predetermined threshold to a voltage drive that limits a predetermined maximum temperature the voice coil and at least one other voice coil and restores to unity if the temperature is under the predetermined limit.

11. The method according to claim 10, wherein the input signal is obtained from a stereo device.

12. The method according to claim 10, wherein the input signal is audio information from a compact disc player.

13. The method according to claim 10, wherein the thermal-model includes an analogous electrical circuit representing a thermal circuit including:

a voice coil thermal impedance having a first resistance representing a thermal resistance from a voice coil to a magnet structure, a first capacitance representing a thermal capacitance of the voice coil to an immediate environment where the first resistance and the first capacitance are coupled in parallel; and a magnetic structure thermal impedance having a second resistance representing a thermal resistance of magnetic structure to ambient air, a second capacitance representing a thermal capacitance of magnet structure to ambient air where the second resistance and the second capacitance are coupled in parallel, where the voice coil thermal impedance and the magnetic structure thermal impedance are coupled in series; and calculating to predict the voice coil temperature based on a relationship that voltage in an electrical circuit equals temperature in a thermal circuit arid current in the electrical circuit equals power applied to the thermal circuit.

14. The method according to claim 13, wherein the estimating the temperature of the voice coil based on the thermal-model further includes:

determining a frequency dependent voice coil thermal impedance characteristic; and calculating the .power into a voice coil based on the voice coil thermal impedance.

15. The method according to claim 10, wherein the predicting power is obtained from a power calculator.

16. The method according to claim 10, wherein the temperature estimate is obtained from a computing device.

17. The method according to claim 16, wherein the computing device computes with a filter.

18. The method according to claim 10, wherein the gain reduction is applied differently over frequency bands of the input signal.

19. The method according to claim 10, wherein the gain reduction is applied differently over the estimated temperature of the voice coil.

20. A compensating power compression system with a plurality of loudspeaker, comprising:

a thermal-model apparatus that processes the input signal to each loudspeaker in the plurality of loudspeakers through the a separate thermal-model included in a separate thermal processing engine coupled a respective voice coil associated with each of the loudspeakers and estimates a temperature for each voice coil, where the thermal-model is dynamically modified by application of a coefficient to the thermal-model in response to a cooling effect value sampled at predetermined times to account for the cooling effect on the voice coil due to vibration of the voice coil in the air;

a digital signal processor (DSP) programmed with a temperature dependent frequency response model of the loudspeaker, wherein the DSP further includes a compensating filter to compensate for a difference between the temperature dependent frequency response model and a predetermined frequency response of a plurality of loudspeakers including the loudspeaker; and a gain apparatus, wherein the gain apparatus provides a reduction in gain to the plurality of loudspeakers if the thermal-model predicts a temperature in the voice coil reaches a predetermined temperature and restores the gain to unity if the temperature is under the predetermined temperature.

21. The power compression system according to claim 20, wherein the thermal-model includes an analogous electrical circuit representing a thermal circuit including:

a voice coil thermal impedance analog having a first resistance representing a thermal resistance from a voice coil to a magnet structure, a first capacitance representing a thermal capacitance of the voice coil to an immediate environment wherein the first resistance and the first capacitance are coupled in parallel; and a magnetic structure thermal impedance analog having a second resistance representing a thermal resistance of magnetic structure to ambient air, a second capacitance representing a thermal capacitance of magnet structure to ambient air, where the second resistance and the second capacitance are coupled in parallel, where the voice coil thermal impedance analog and the magnetic structure thermal impedance analog are coupled in series; and calculating to predict the voice coil temperature based on a relationship tat voltage in an electrical circuit equals temperature in the thermal circuit and current in the electrical circuit equals power applied to a thermal circuit.

22. The power compression system according to claim 20, wherein the temperature dependent frequency response of the voice coil is modeled by a function.

23. The power compression system according to claim 22, wherein the function is a lookup table.

24. The power compression system according to claim 20, wherein the predetermined frequency response corresponds to a loudspeaker ambient frequency response.

25. The power compression system according to claim 20, wherein the gain. reduction is applied differently over said frequency band.

26. The power compression system according to claim 20, wherein the gain reduction is applied differently over the estimated temperature of the voice coil.

27. A method for compensating for temperature dependent performance degradation in a loudspeaker, comprising:

predicting an input power being delivered to a voice coil based on an input signal representative of voltage being fed to a loudspeaker that is part of a plurality of loudspeakers where each loudspeaker has an associated voice coil;

processing the input signal to each loudspeaker through a separate thermal processing engine coupled to each voice coil;

estimating a temperature for each voice coil based on a thermal-model included in each thermal-processing engine by determining a frequency dependent voice coil thermal impedance characteristic; and modifying the input signal to the voice coil and at least one other associated voice coil with equalization parameters that are set in response to the thermal-model, when the temperature reaches a predetermined threshold and restoring the input signal when the temperature is under the predetermine limit.

28. The method according to claim 27, wherein the thermal-model is changed dynamically to simulate the cooling effects of the voice coil movement.

29. The method according to claim 27, wherein the thermal-model includes:

a voice coil thermal impedance having a first thermal resistance from a voice coil to a magnet structure and a first thermal capacitance of the voice coil to an immediate environment where the first thermal resistance and the first thermal capacitance are coupled in parallel; and a magnetic structure thermal impedance having a second thermal resistance of magnetic structure to ambient air, a second thermal capacitance of magnet structure to ambient air, and where the second thermal resistance and the second thermal capacitance are coupled in parallel;

and where the voice coil thermal impedance and the magnetic structure thermal impedance are coupled in series.

30. The method according to claim 29, wherein the estimating the temperature of the voice coil based on the thermal-model further includes:

calculating the power into a voice coil based on the voice coil thermal impedance.

31. The method according to claim 27, wherein said temperature estimate is obtained from a computing device.

32. The method according to claim 31, wherein the computing device computes with a filter.

33. The method according to claim 32, wherein the filter is an infinite duration impulse response (IIR) filter.

34. The method according to claim 32, further including equalizing the filter to correspond to a frequency response curve for a loudspeaker that is modeled by a function.

35. The method according to claim 34, wherein the function is a lookup table.

36. The method according to claim 34, wherein the frequency response corresponds to a loudspeaker ambient frequency response.

* * * * *

UNITED STATES PATENT AND TRADEMARK OFFICE
CERTIFICATE OF CORRECTION

PATENT NO. : 7,447,318 B2
APPLICATION NO. : 09/949425
DATED : November 4, 2008
INVENTOR(S) : Button et al.

It is certified that error appears in the above-identified patent and that said Letters Patent is hereby corrected as shown below:

In the Background of the Invention:

Column 1: line 32, --an-- should be inserted after "provide"; line 40, --a-- should be inserted after "As"; line 41, --an-- should be inserted after "or"; and line 61, --the-- should be inserted after "as".

Column 2, line 8, --a-- should be inserted after "in".

In the Summary:

Column 2, line 30, --a-- should be inserted after "include".

Brief Description of the Drawings:

Column 3, line 26, "bands" should be --band--.

Detailed Description of the Preferred Embodiments:

Column 4, line 38, "mid-rang" should be --mid-range--.

In the Claims:

Claim 1, line 62, "loudspeaker" should be --loudspeakers--.

Claim 3, line 31, "the" should be deleted.

Claim 8, line 48, "lockup" should be --lookup--.

Claim 10: at the end of line 56 and beginning of line 57, "loudspeaker" should be --loudspeakers--; and line 6, --of-- should be inserted after "temperature".

Claim 13, line 33, "arid" should be --and--.

Claim 14, line 35, "the" should be deleted.

UNITED STATES PATENT AND TRADEMARK OFFICE
CERTIFICATE OF CORRECTION

PATENT NO. : 7,447,318 B2
APPLICATION NO. : 09/949425
DATED : November 4, 2008
INVENTOR(S) : Button et al.

It is certified that error appears in the above-identified patent and that said Letters Patent is hereby corrected as shown below:

Claim 20: line 56, "loudspeaker" should be --loudspeakers--; and line 60, --to-- should be inserted after "coupled".

Claim 21: line 21, a --,-- should be inserted after "environment"; and line 32, "tat" should be --that--.

Claim 25, line 46, the "." after "gain" should be deleted.

Claim 30, line 35, "the" should be deleted.

Signed and Sealed this

Twenty-third Day of June, 2009

JOHN DOLL
*Acting Director of the United States Patent and Trademark Office*